United States Patent [19]

Tucker

[11] Patent Number: 4,780,941

[45] Date of Patent: Nov. 1, 1988

[54] QUICK MOUNT HAND VALVE SPRING COMPRESSOR

[76] Inventor: Thomas L. Tucker, Rte. 1, Box 285, McKinney, Tex. 75069

[21] Appl. No.: 57,110

[22] Filed: Jun. 3, 1987

[51] Int. Cl.[4] .............................................. B23P 19/04

[52] U.S. Cl. ....................................................... 29/217

[58] Field of Search .................................. 29/215-218, 29/227, 256, 258, 263, 264; 254/10.5; 269/243

[56] References Cited

U.S. PATENT DOCUMENTS 2,270,448 1/1942 Juhl ..................................... 269/243

3,161,166 12/1964 Erwin ................................. 269/243

FOREIGN PATENT DOCUMENTS 1025476 4/1953 France ................................. 29/217

OTHER PUBLICATIONS

Automotive Engines, Construction, Operation, and Maintenance; Third Edition; William H. Crouse, author; McGraw-Hill Book Company, pp. 430 and 431.

*Primary Examiner*—Robert C. Watson

*Attorney, Agent, or Firm*—Warren H. Kintzinger

[57] ABSTRACT

A valve spring compressor hand tool quickly mounted on a rocker arm mounting stud on the top of a cylinder head for compressing a valve stem spring to release and remove the valve retainer lock for replacing a single valve spring, stem seal, or shield without removing the cylinder head on many automotive engine models. The valve spring compressor is a three piece tool including a mounting stud thread lock position engaging tool element with an internal half thread section, a threaded top and a tilt support base, a sleeve having a bifurcated valve spring top engaging side extension rotationally keyed to and slideable along the tool element from the top thereof to a keyway bottom stop position, and a manual handle member internally threaded to fit the threaded top of the thread lock position engaging tool element and turnable downward against the top of the sleeve with the bifurcated side extension to press the sleeve downward compressing the valve spring for valve retainer lock removal.

7 Claims, 4 Drawing Sheets

QUICK MOUNT HAND VALVE SPRING COMPRESSOR

Figure 2:
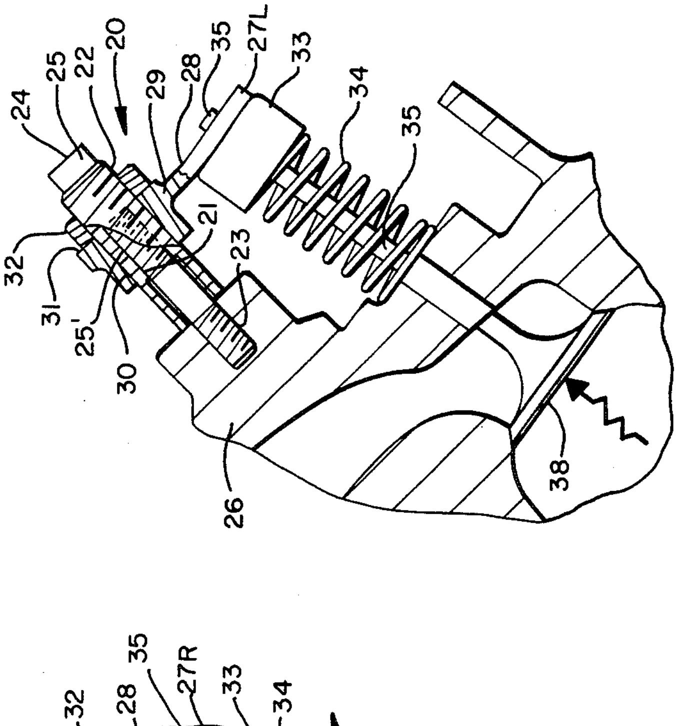
FIG. 2 PRIOR ART

This invention relates in general to internal combustion engine valve spring compression tools for valve retainer lock release, and more particularly, to a quick mount hand valve spring compressor useable on a cylinder head not removed from the engine.

There are many different valve spring compressor tools available for use in compressing engine valve stem springs for release of the valve stem retainer lock for removal of valve springs, valve-stem seals or shields and other valve related components. Many of these tools require dismounting of an engine head for their use and/or removal of other engine components such as carburator, air conditioning components and/or generators or alternators and at times after components for tool clearance in their designed use. One prior art valve spring compressing tool has a body portion that threads down on a rocker arm stud and has a valve spring top engaging member that is tightened down by a nut on the body portion requiring the use of a wrench which again encounters the problem of interference with engine components when in use.

It is therefore a principal object of this invention to provide a manually operated engine valve spring compression tool useable without additional tools.

Another object is to provide such a valve spring compression tool useable on a cylinder head in place on an engine.

A further object is to provide a valve spring compression tool useable with minimal removal of engine components.

Still another object is to provide such a valve spring compression tool quickly and easily mountable and useable on a rocker arm that is quickly operated by hand and easily released after use.

Features of the invention useful in accomplishing the above objects include, in a quick mount hand engine valve spring compressor, a valve spring compressor hand tool quickly mounted on a rocker arm mounting stud on the top of a cylinder head for compressing a valve stem spring to release and remove the valve retainer lock for replacing a single valve spring, stem seal, or shield without removing the cylinder head on many automotive engine models. The valve spring compressor is a three piece tool including a mounting stud thread lock position engaging tool element with an internal half thread section, a threaded top and a tilt support base, a sleeve having a bifurcated valve spring top engaging side extension rotationally keyed to and slideable along the tool element from the top thereof to a keyway bottom stop position, and a manual handle member internally threaded to fit the threaded top of the thread lock position engaging tool element and turnable downward against the top of the sleeve with the bifurcated side extension to press the sleeve downward compressing the valve spring for valve retainer lock removal. The internal half thread section is canted at an angle from the vertical consistant with a tilt surface at substantially ninety degrees thereto on the bottom of the tilt support base in addition to a base portion at right angles to vertical axis of the mounting stud threaded lock position engaging tool element. The pivot force reaction force engendered in compressing a valve spring enhances the internal half thread section position lock engagement with a rocker arm threaded stud.

A specific embodiment representing what is presently regarded as the best mode of carrying out the invention is illustrated in the accompanying drawings.

Figure 1:
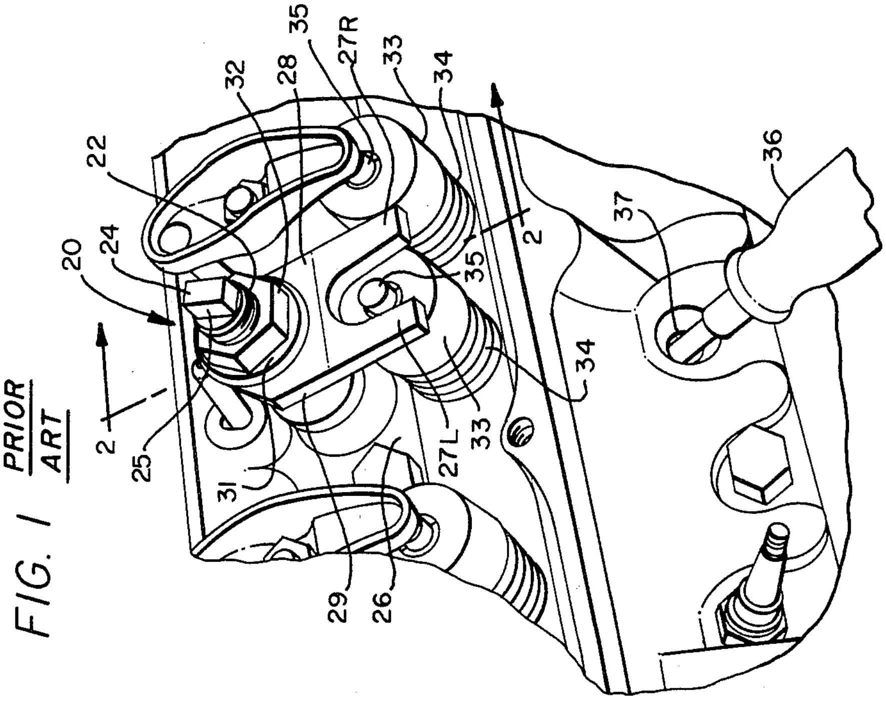
FIG. 1 PRIOR ART
Figure 4:
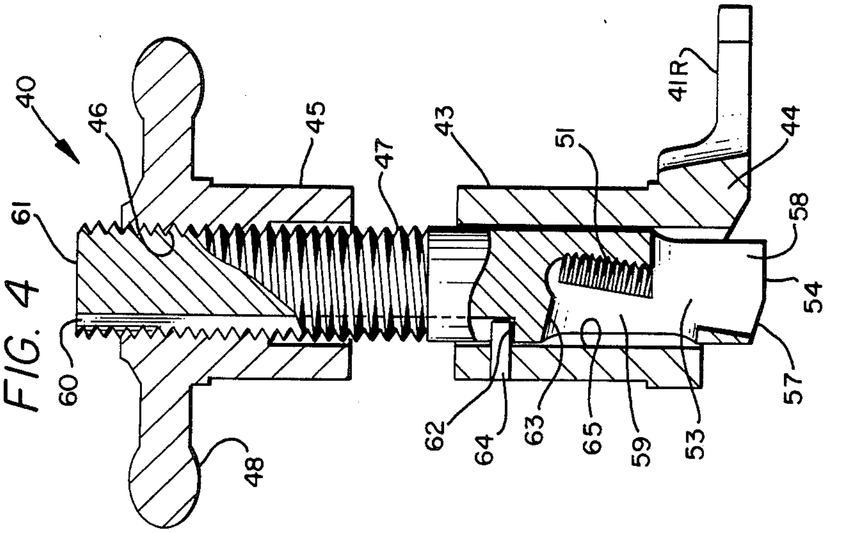
Figure 3:
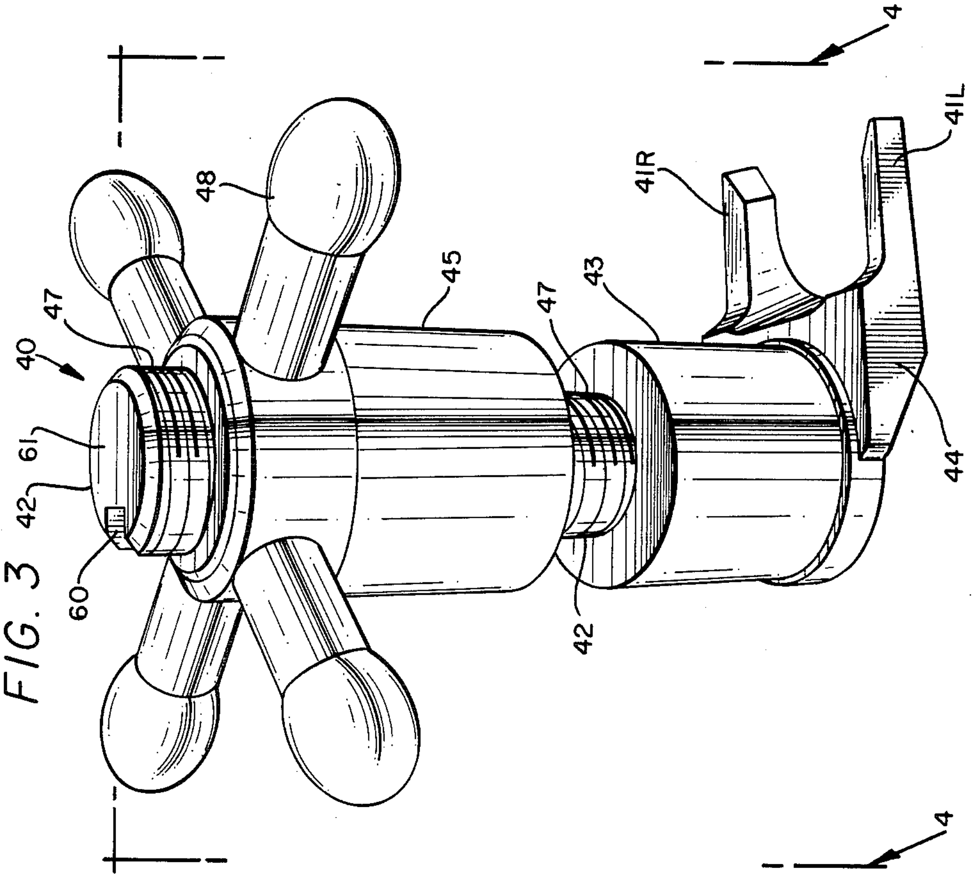
Figure 6:
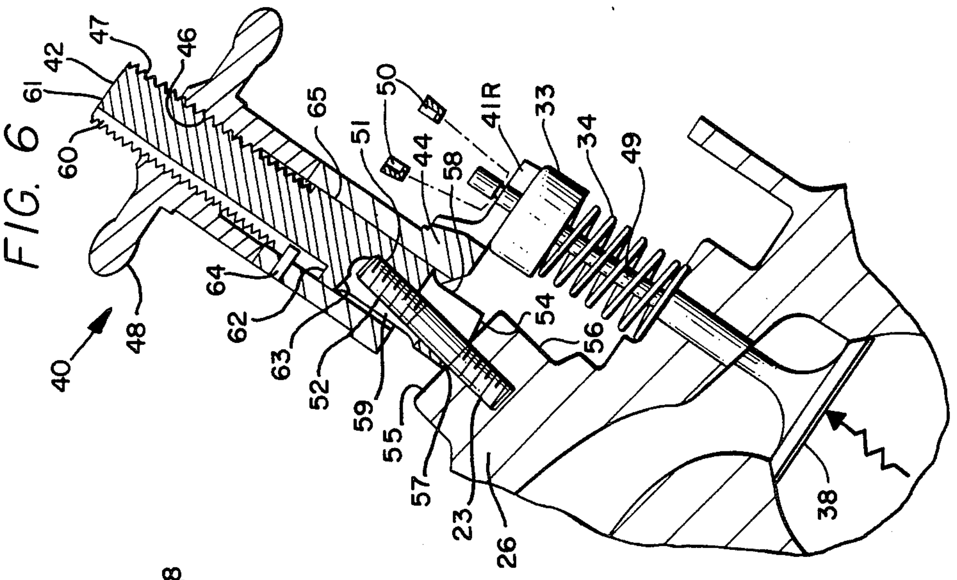
Figure 5B:
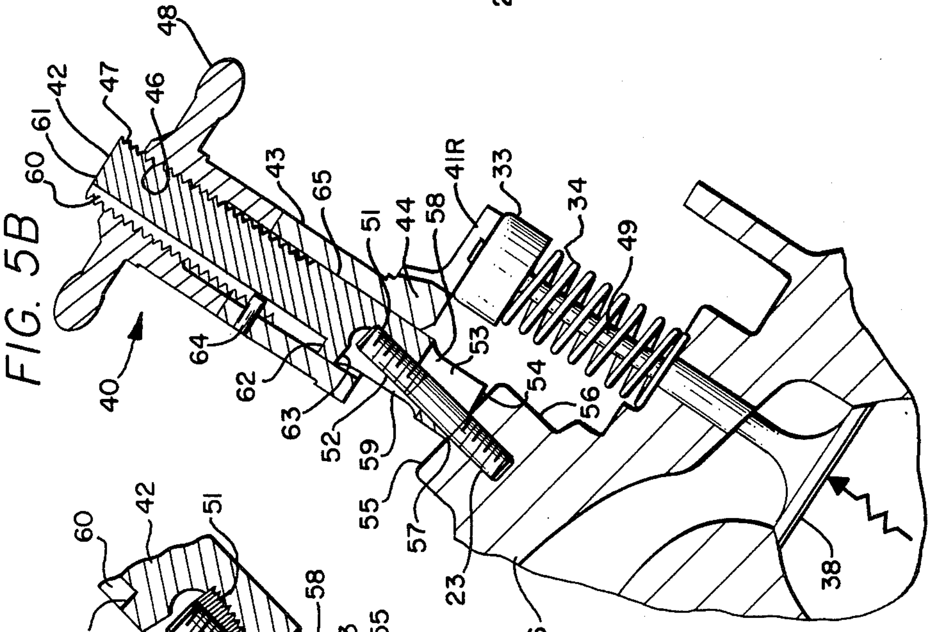
Figure 5A:
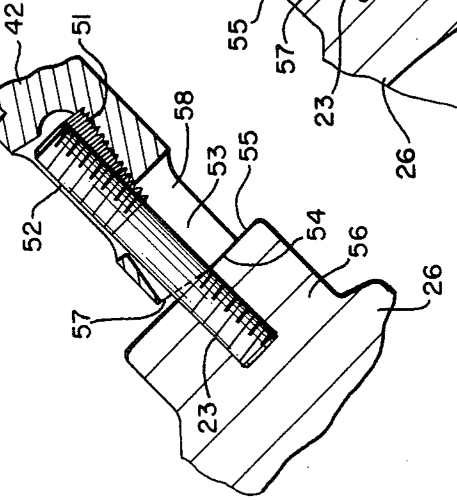
Figure 7:
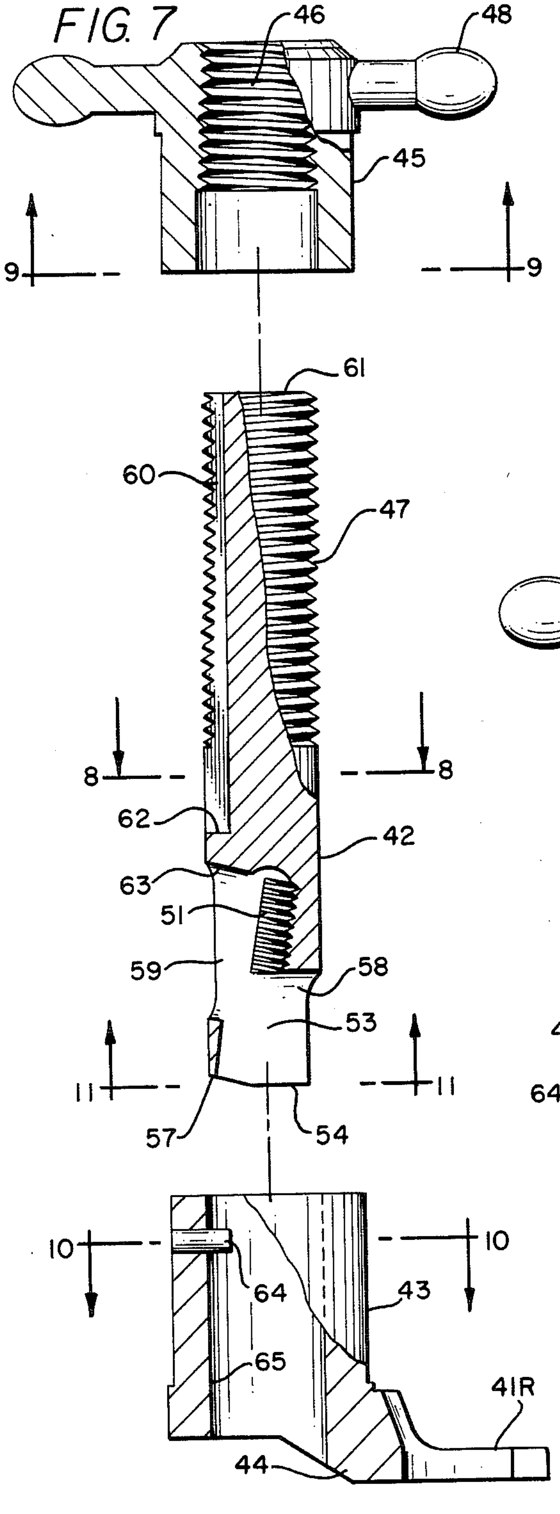
Figure 8:
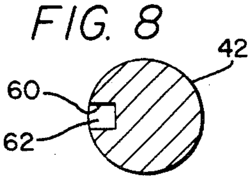
Figure 9:
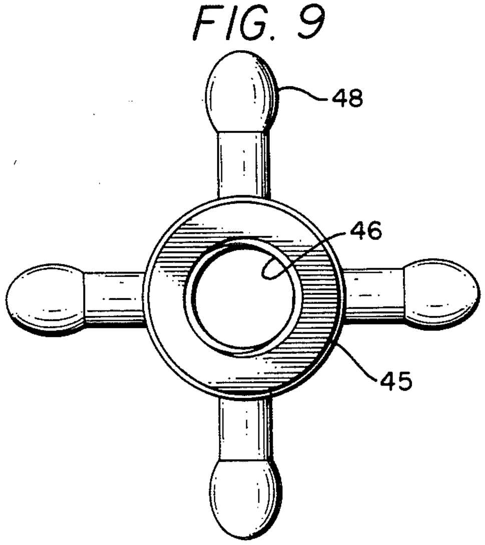
Figure 10:
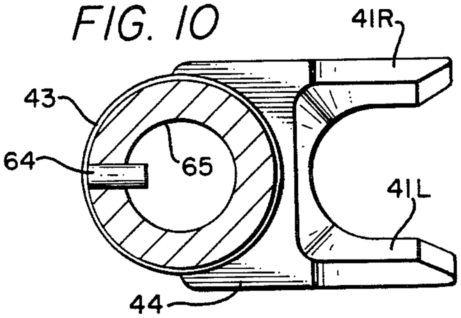
Figure 11:
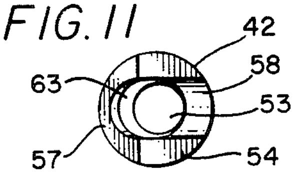

In the drawings:

FIG. 1 represents a perspective view of a valve spring compressor tool installed in place on a rocker arm stud in position for compressing a valve spring on a cylinder head;

FIG. 2, a partial cut away and sectioned view of the prior art valve spring compressor taken along line 2—2 of FIG. 1;

FIG. 3, a perspective view of the new quick mount hand manual valve spring compressor;

FIG. 4, a cut away and sectioned view taken along line 4—4 of FIG. 3 of the new quick mount hand manual valve spring compressor;

FIG. 5A, a partial cut away and sectioned view of the rocker arm stud engaging mounting stud thread lock position engaging element of the tool having just been slipped into place on a cylinder head rocker arm stud;

FIG. 5B, a partial cut away and sectioned view of the manual valve spring compressor tool tilted into the stud thread locked position engaged state;

FIG. 6, a partial cut away and sectioned view like FIG. 5B with the manual handle member partially threaded down and a valve spring compressed for valve stem retainer lock release;

FIG. 7, a partially broken away and sectioned exploded elevation view of the three element manual valve spring compressor tool;

FIG. 8, a sectioned view along line 8—8 of FIG. 7, through the lock position engaging element showing the keyway for the sleeve element with the valve spring engaging bifurcations;

FIG. 9, a bottom view from line 9—9 in FIG. 7 of the manual handle member of the tool;

FIG. 10, a cut away and sectioned plan view taken along line 10—10 of a FIG. 7 showing detail of the sleeve element with the valve spring engaging bifurcations; and FIG. 11, a bottom view from line 11—11 in FIG. 7 of the stud thread lock position engaging element of the tool.

Referring to the drawings:

The prior art engine valve spring compressor tool 20 of FIGS. 1 and 2 is shown to have an internally threaded 21 and externally threaded 22 rocker arm stud 23 mounted member 24 with a flat sided wrench head 25 for being tightened down on the threads 25' of the cylinder head 26 mounted rocker arm stud 23. The tool 20 also includes a bifurcated two arm 27L and 27R member 28 having a base 29 with an opening 30 that is a sliding fit over the external threads 22 of member 24 and a top 31 that a wrench turnable nut 32 engages. When nut 32 is turned down on threads 22 of member 24 it lowers the member 28 with the bifurcated two arms 27L and 27R pressing down on the top of the valve spring assembly cap 33 compressing valve spring 34 for release (or reinsertion) of the valve stem 35 retainer lock. This entails use of a wrench on nut 32 that may encounter obstruction in the form of other engine components such as carburators, air conditioning system equipment, electrical power generating equipment and other components some of which may have to be demounted to facilitate use of the prior art valve spring compressor tool 20. It should be noted that a valve holding tool 36 may be inserted through a spark-plug hole 37 to hold the valve 38 up while the valve spring 34 is compressed so that the retainer can be removed to permit removal of the spring 34 and stem seal. An alternate method is for air pressure from an air compressor to be applied through an adapter attached to the end of an air hose and threaded into the spark plug hole of that cylinder to hold the valve closed while the spring 34 is compressed.

The quick mount hand manual valve spring compressor tool 40 of FIGS. 3–11 may be positioned in place for use on a rocker arm stud 23 with bifurcation arms 41 L and 41R engaging the top of the valve spring assembly cap 33 ready to start compressing valve spring 34 much quicker and easier that with the prior art tool of FIGS. 1 and 2. The improved valve spring compressor tool 40 is a three piece tool including, a mounting stud thread lock position engaging tool element 42, a sleeve 43 have a bifurcated valve spring assembly top cap 33 engaging side extension 44 with bifurcation arms 41L and 41R, and a manual handle member 45 internally threaded 46 to fit the threaded 47 upper portion os the thread position lock engaging tool element 42. The manual handle member 45 with a faucet type handle 48 is turnable downward on element 42 against the top of the sleeve 43 with the bifurcation arms 41L and 41R to press the sleeve 43 downward compressing the valve spring for valve stem 49 retainer lock 50 removal.

The mounting stud thread lock position engaging tool element 42 has an internal partial thread section 51 canted at an angle in the approximate range of 5 to 10 degrees from the vertical axis of the tool element 42 such that when the tool element 42 is placed down on a rocker arm stud 23 mounted in a cylinder head 26 the threaded top 52 of the stud 23 projects up into the bottom internal opening 53 of the tool element 42. Then the tool element 42 is rocked over bringing the internal partial (half) threaded section 51 into position locking engagement with the threaded top 52 of rocker arm stud 23. As shown in FIG. 5A tool element 42 has a bottom surface 54 substantially normal to the vertical axis of the element 42 that rests on the top 55 of the cylinder head rocker arm stud boss 56, and also a bottom surface 57 angled up in the approximate range of five to ten degrees from surface 54 so as to be brought into support contact with boss top 55 when tool element 42 is rocked over into position locking engagement with rocker arm stud 23. A side clearance opening 58 extends out on one side from the bottom internal opening 53 and upwardly from the bottom surface 54, and on the opposite side from the internal partial thread section 51, an elongate opening 59 vertically extends through a range more than the partial thread section 51 and serves as a view port for observing the condition of the partial thread section 51. A keyway slot 60 is also provided in tool element 42 extending from the top 61 thereof through the upper portion threads 47 down to a bottom end 62 in line with and closely adjacent the top 63 of elongate opening 59.

The sleeve 43 with the bifurcated side extensions 44 with the two bifurcation arms 41L and 41R is provided with a keyway pin 64 that projects into the keyway slot 60 so that the sleeve 43 is keyed to the tool element 42 and the sleeve opening 65 is a sliding fit on the tool element 42 so that the sleeve 43 is slideable along the tool element from the top 61 thereof to the keyway slot bottom 62 stop position.

The manually operated handle member 45, that is the third element of the three piece valve spring compressor tool 40, is turned downwardly on element 42 against the top of the sleeve 43. Then as the bifurcation arms 41L and 41R start compressing valve spring 34 the resilient reaction force engendered thereby enhances the internal partial threaded section 51 position lock engagement with the threaded top 52 of the rocker arm stud 23. In this tool 40 state the tilt support base of tool element 42 is tilted over with bottom surface 57 resting on top 55 of cylinder head rocker arm stud boss 56. With the new quick mount hand operated manual valve spring compressor tool 40 a valve holding tool 36 may be inserted through a spark-plug hole 37 to hold valve 38 up while the valve spring 34 is compressed just as has been described with the prior art showing of FIGS. 1 and 2. In the alternative air pressure from an air compressor can be applied through an air line and an adapter on the air line threaded into the spark-plug hole of cylinder with the valve having a valve spring compressed.

Whereas this invention has been described with respect to a single embodiment thereof, it should be realized that various changes may be made without departure from the essential contributions to the art made by the teachings hereof.

I claim:

1. A quick mount manual engine valve spring compressor comprising: a mounting stud thread lock position engaging tool element with a rocker arm mounting stud threaded top receiving bottom opening having an internal thread section moveable into and out of engagement with threads on the top of said rocker arm mounting stud, an externally threaded top and a support base; sleeve means having a center opening slideable along said tool element and having a valve spring assembly top engaging side extension; key means rotationally keying said sleeve means and said tool element together through a range of sliding movement of said sleeve means on said tool element; manual handle means internally threaded to fit the top of said tool element turnable downward on said externally threaded top on the tool element; and bottom means on said manual handle means engageable with the top of said sleeve means to press the sleeve means downward to compress a valve spring for valve retainer lock removal; wherein said valve spring assembly top engaging side extension includes two arms as a bifurcated extension of said extension; said two arms are spaced to avoid contact with valve spring retainer lock structure while engaging the top of a valve spring assembly; said side extension is a side extension from the bottom of said sleeve means; said key means includes a groove keyway and pin interconnection between said sleeve means and said tool element; said groove keyway is a vertically extended groove extended from the top of said tool element through to below said externally threaded top of said tool element; and said pin is mounted in said sleeve means to extend into center opening in said sleeve means; said pin is mounted in said sleeve means body above the level of said side extension; said pin is mounted in the back side of said sleeve means body from said side extension; said internal thread section is a partial thread section with partial thread grooves cut through no more than half a circle to facilitate the partial thread grooves in said partial thread section being moved into and out of thread lock position engagement with threads of a rocker arm mounting stud threaded top.

2. The quick mount manual engine valve spring compressor of claim 1, wherein said two arms in said bifurcated extension are spaced substantially parallel arms interconnected adjacent the sleeve body of said sleeve means by, in plan view, a smoothly rounded interconnecting portion of said side extension.

3. The quick mount manual engine valve spring compressor of claim 1, wherein said internal partial thread section is canted at an angle from the vertical axis of said tool elements to facilitate movement of said partial thread grooves in said partial thread section into and out of thread lock position engagement with threads of a rocker arm mounting stud threaded top.

4. The quick mount manual engine valve spring compressor of claim 3, wherein said partial thread section is in the forward side of said bottom opening in said tool element, with the forward side of said tool element being the side of said extension, for pivot force reaction force engendered in compressing a valve spring to enhance partial thread section position lock engagement with threads of a rocker arm mounting stud threaded top.

5. The quick mount manual engine valve spring compressor of claim 4, wherein said tool element support base includes a forward base portion approximately at right angles to the vertical axis of said tool element; and a tilt surface extended rearwardly and upwardly from said forward base portion.

6. The quick mount manual engine valve spring compressor of claim 5, wherein said internal partial thread section is canted at an angle from the vertical axis of said tool element in the approximate range of five to ten degrees; and said tilt surface is angled upward from the plane of said forward base portion in the approximate range of five to ten degrees.

7. The quick mount manual engine valve spring compressor of claim 6, wherein the axis of said internal partial thread section is normal to the plane of said tilt surface.

* * * * *